(12) United States Patent
Gaddam (10) Patent No.: US 9,100,226 B2
(45) Date of Patent: *Aug. 4, 2015

(54) ROBUST SENSING OF DVB-T/H TRANSMISSIONS IN THE PRESENCE OF FREQUENCY OFFSETS

(75) Inventor: Vasanth Gaddam, Tarrytown, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 708 days.

This patent is subject to a terminal disclaimer.

(21) Appl. No.: 13/319,820

(22) PCT Filed: Apr. 23, 2010

(86) PCT No.: PCT/IB2010/051798
§ 371 (c)(1),
(2), (4) Date: Nov. 10, 2011

(87) PCT Pub. No.: WO2010/131139
PCT Pub. Date: Nov. 18, 2010

(65) Prior Publication Data
US 2012/0050547 A1   Mar. 1, 2012

Related U.S. Application Data

(60) Provisional application No. 61/178,257, filed on May 14, 2009.

(51) Int. Cl.
*H04L 27/12* (2006.01)
*H04L 27/00* (2006.01)
*H04L 27/26* (2006.01)

(52) U.S. Cl.
CPC ........ *H04L 27/0012* (2013.01); *H04L 27/2657* (2013.01); *H04L 27/2675* (2013.01); *H04L 27/2607* (2013.01); *H04L 2027/0026* (2013.01)

(58) Field of Classification Search
CPC ............ H04L 27/2675; H04L 27/0012; H04L 27/2657; H04L 2027/0026; H04L 27/2607; H04N 5/4401; H04N 21/6112; H04N 21/4382; H04H 40/27; H04H 60/51; H04H 60/41
USPC ......... 375/316, 340, 322, 324, 325, 326, 354; 370/208, 210, 203, 491
See application file for complete search history.

(56) References Cited

U.S. PATENT DOCUMENTS

| | | | |
|---|---|---|---|
| 6,359,938 B1 * | 3/2002 | Keevill et al. | 375/316 |
| 7,424,067 B2 * | 9/2008 | Vanderperren et al. | 375/326 |
| 2005/0286406 A1 * | 12/2005 | Jeon et al. | 370/208 |

FOREIGN PATENT DOCUMENTS

| | | |
|---|---|---|
| EP | 0895388 A2 | 3/1999 |
| WO | WO2006077559 A2 | 7/2006 |
| WO | WO2008110886 A2 | 9/2008 |

OTHER PUBLICATIONS

Dong-Kyu Kim et al., "Performance Evaluation of the Frequency Detectors for Orthogonal Frequency Division Multiplexing", International Conference on Consumer Electronics, ICCE-1997, vol. 43, No. 3, Jun. 11, 1997, Jun. 11-13, 1997 pp. 776-783.

(Continued)

*Primary Examiner* — Vineeta Panwalkar
(74) *Attorney, Agent, or Firm* — Larry Liberchuk (57) ABSTRACT

A method and system is provided for detecting the presence of a DVB (digital video broadcasting) transmission with frequency offsets. The method includes receiving an RF (radio frequency) signal in a selected channel; creating samples from the received RF signal; estimating a frequency offset of the samples; correcting the samples with the estimated frequency offset; correlating the corrected samples with a reference signal; and comparing a correlation result with a threshold value. The frequency offset estimation includes selecting a set of three or more pilots that are boosted continual pilots transmitted at fixed sub-carrier locations in all symbols; transforming the received samples to the frequency domain; determining locations of maxima in the transformed samples, the maxima corresponding to the pilots in the set; and comparing the determined locations with the expected pilot locations in the set.

15 Claims, 5 Drawing Sheets (56) References Cited

OTHER PUBLICATIONS

Kyung-Taek Lee et al., "Pilot-Aided Iterative Frequency Offset Estimation for Digital Video Broadcasting Systems" IEEE International Conference on Consumer Electronics, ICCE-2007, Jan. 1, 2007, pp. 1-2.

Chenyu Huang et al., "Combination of Coarse Symbol Timing and Carrier Frequency Offset (CFO) Estimation Techniques for MIMO OFDM Systems", IEEE Canadian Conference on Electrical and Computer Engineering, May 1, 2006, pp. 472-477.

S. Rosati et al., "OFDM Post-FFT Frequency Recovery Based on Silent Sub-Carriers", IEEE 10th International Symposium on Spread Spectrum Techniques and Applications—ISSSTA '08., Aug. 25, 2008, pp. 452-457.

* cited by examiner

ROBUST SENSING OF DVB-T/H TRANSMISSIONS IN THE PRESENCE OF FREQUENCY OFFSETS

This application claims the benefit of U.S. Provisional Application No. 61/178,257 filed on May 14, 2009.

The invention generally relates to devices in a cognitive radio (CR) network, and more particularly, to a method and system which senses digital video broadcasting (DVB) transmissions.

New spectrum policies being adopted by some of the regulatory bodies envision the operation of unlicensed secondary devices in the frequency bands designated for licensed operation. The secondary devices can operate only when that frequency band is vacant or not being used by a primary device. This implies that the secondary devices have to vacate the band when a primary device starts transmission in order to minimize the amount of interference the secondary devices would cause to the primary devices. The secondary devices are also referred to as Cognitive Radios (CR) due to their ability to sense the environment and adapt accordingly.

The UHF (Ultra High Frequency) band allocated for the licensed operation of television broadcasting is an ideal candidate for allowing the operation of CR devices. In the United States, in order to avoid interference to or from broadcasts from neighboring markets and/or transmissions, only some of the TV bands can be used in any given geographical location. As a result, the remaining TV bands are largely unused and therefore can be utilized for other purposes (such as in-home networking, etc). Other regulatory domains also have similar allocation of TV channels.

In order to avoid harmful interference to digital television (DTV) reception, the CR devices should sense the channel for primary transmissions before the CR devices can use that particular channel. Regulatory bodies have stipulated reliable detection of DTV signals at signal strengths as low as −114 dBm. This requirement mandates that the CR devices implement robust sensing algorithms to detect the presence of DTV signals. Sensing algorithms for the robust detection of DVB-T/H (Digital Video Broadcasting-Terrestrial/Handheld) signals have been recently proposed. Time domain cross-correlation based sensing algorithms provide reliable detection of DVB-T and DVB-H transmissions under various channel conditions assuming perfect carrier synchronization. However, the algorithms' performance degrades significantly in the presence of a carrier frequency offset. The present invention provides an algorithm to estimate and correct for the frequency offset in order to enable a robust detection under different channel and operating conditions. The proposed methods can be configured for use with different transmission modes.

In one example embodiment of the invention, a method is provided for detecting the presence of a DVB transmission with frequency offset. The method includes receiving an RF (radio frequency) signal in a selected channel; creating samples from the received RF signal; estimating frequency offset of the samples; correcting the samples with the estimated frequency offset; correlating the corrected samples with a reference signal; and comparing a correlation result with a threshold value. The frequency offset estimation includes selecting a set of three or more pilots that are boosted continual pilots transmitted at fixed sub-carrier locations in all symbols; transforming the received samples to the frequency domain; determining locations of maxima in the transformed sample, the maxima corresponding to the pilots in the set; and comparing the determined locations with the expected pilot locations in the set.

In another example embodiment of the invention, a system is provided for detecting the presence of a DVB transmission. The system includes an RF front-end module for receiving an RF signal; a sampling module for creating samples from the received RF signal; a frequency offset estimator for estimating a frequency offset of the received signal; a frequency offset correction module for correcting the frequency of the samples; a correlator for correlating the corrected samples with a reference signal; and a threshold detection module for comparing a correlation result with a threshold value. The system may further include an accumulator and averaging module to average results across multiple blocks of samples or over multiple sets of pilots, and a memory module for storing samples from the received RF signal.

Another example embodiment of the invention provides a method for detecting the presence of a DVB transmission. The method includes receiving an RF signal in a selected channel; creating samples from the received RF signal; selecting a set of three or more pilots that are boosted continual pilots transmitted at fixed sub-carrier locations in all symbols; transforming the samples to the frequency domain; identifying locations of maxima in the transformed samples; and determining whether the identified maxima correspond to the pilots in the set.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Brief Overview of DVB-T Transmission Specification

The terrestrial Digital Video Broadcasting (DVB-T) has been standardized by the European Telecommunications Standards Union (ETSI) for the terrestrial broadcasting of digital TV. The DVB-T standard uses an orthogonal frequency division multiplexing (OFDM) modulation scheme and provides options to adapt the coding and modulation parameters according to broadcaster's requirements. The DVB-T specification provides two modes of operations: the '2K mode' and the '8K mode'. In addition, the DVB-H enhancement provides the '4K mode'. The modes are defined based on the FFT (Fast Fourier Transform) size used to generate the transmitted signals. Some of the parameters for each of these modes are listed in Table 1.

TABLE 1

DVB-T Parameters for 8K and 2K mode

| Parameter | 8K mode | 2K mode |
|---|---|---|
| Number of carriers K | 6817 | 1705 |
| Value of carrier number $K_{min}$ | 0 | 0 |
| Value of carrier number $K_{max}$ | 6816 | 1704 |
| Duration $T_U$ | 896 μs | 224 μs |
| Carrier Spacing 1/Tu | 1116 Hz | 4464 Hz |
| Spacing between carriers $K_{min}$ and $K_{max}$ (K − 1)/Tu | 7.61 MHz | 7.61 MHz |

Figure 1:
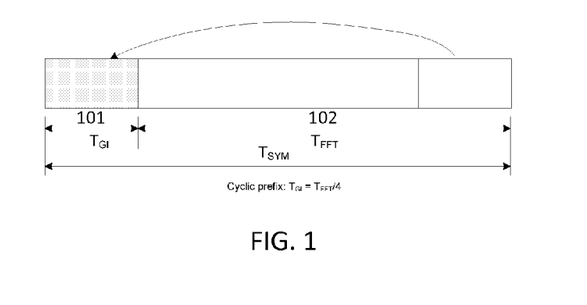
FIG. 1 illustrates an OFDM symbol with cyclic prefix (CP).

The DVB-T transmitted signal is organized in frames. Each frame consists of 68 OFDM symbols and four such frames make up a super-frame. As shown in FIG. 1, an OFDM symbol consists of two parts: a useful symbol period 102 and a guard interval 101. A portion of the useful symbol is transmitted in guard interval 101 (referred to as cyclic prefix (CP)) and this feature is used to minimize the inter-symbol interference. The DVB-T specification provides a choice of ¼, ⅛, 1/16 or 1/32 of the symbol period for the guard interval.

In addition to the CP, the DVB-T standard provides the following reference signals to assist in the synchronization, demodulation and decoding of the signal.

Continual pilots—These reference signals are placed at fixed sub-carriers locations and their location does not vary from symbol to symbol. There are 45 continual pilots in the '2K mode' and 177 continual pilots in the '8K mode'.

Figure 2:
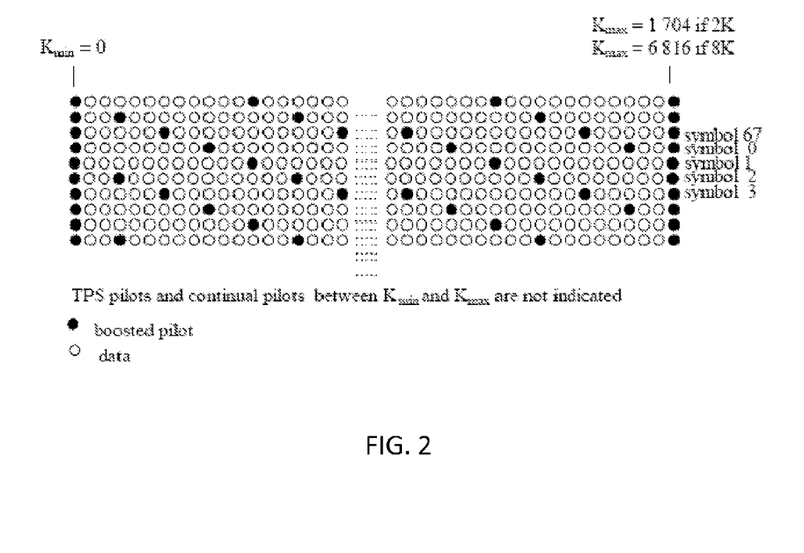
FIG. 2 illustrates the location of scattered pilot sub-carriers in DVB-T OFDM symbols.

Scattered pilots—These reference signals are distributed evenly (every $12^{th}$ sub-carrier) in the OFDM symbol. The location of these pilots is offset by three sub-carriers on each OFDM symbol and, as a result, the pilot pattern repeats every four OFDM symbols as shown FIG. 2. The scattered pilots are used to derive the channel estimate assuming that the channel is quasi-static.

TPS pilots—These Transmission Parameter Signaling (TPS) reference signals are used to carry the transmission parameters. A fixed set of 17 sub-carriers for the '2K mode' and 68 sub-carriers for the '8K mode' has been designated as TPS pilot sub-carriers. All the TPS pilot sub-carriers in an OFDM symbol carry the same information.

The continual pilots and scattered pilots are transmitted at a higher power level (~2.5 dB) compared to the rest of the sub-carriers.

Frequency Offset Estimation and Detection

Figure 3:
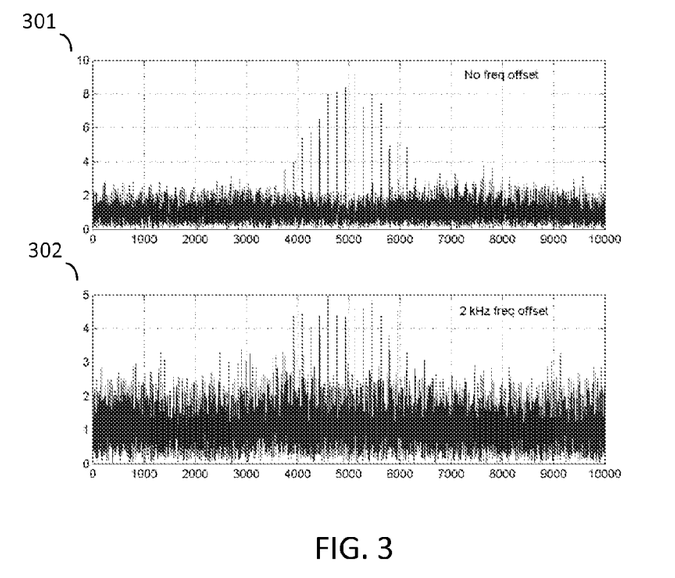
FIG. 3 illustrates the cross-correlation (without data smoothing) on pilots for 2K, 1/32 mode with an SNR of −5 dB with and without a frequency offset.

FIG. 3 compares the performance of the cross-correlator based detector with a frequency offset 302 and without a frequency offset 301 for a 2K, 1/32 mode DVB-T signal with an SNR of −5 dB. It can be observed from FIG. 3 that the performance of the cross-correlation based detector suffers significantly in the presence of a frequency offset.

Using auto-correlation instead of cross-correlation will minimize the performance loss, but this method does not work very well for low SNRs (signal to noise ratios). Estimating the frequency offset and then correcting it before cross-correlation would minimize the performance loss while also performing robustly for low SNRs.

Certain embodiments of the present invention provide a frequency offset estimator that performs reasonably well even for low SNRs values. The estimator makes use of the fact that the DVB-T signal includes boosted continual pilots that are transmitted at fixed sub-carrier locations in all symbols.

In one example embodiment, sets of three (or more) continual pilots that are closely spaced in frequency are identified. For example, in the case of the 2K mode, these sets could be {1101, 1107, 1110}, {1137, 1140, 1146}. The span of these sub-carriers is typically around 50 kHz. The center frequency $\bar{f}_c$ can be determined by taking the mean of the sub-carriers locations and multiplying it by the sub-carrier spacing. The center frequency $\bar{f}_c$ can take values between $$-\frac{f_{BW}}{2} \text{ and } +\frac{f_{BW}}{2},$$

where $f_{BW}$ represents the channel bandwidth. In radio communications, an intermediate frequency (IF) is commonly referred to as a frequency to which a carrier frequency is shifted as an intermediate step in transmission or reception.

The following is an illustrative, but not limiting, example of the offset estimation procedure.

Assuming that the IF signal is located at $f_{IF}$ and the sampling rate is $f_s$, the estimation steps are:

(1) Downshift the signal to DC by the nominal frequency offset of $f_c$, where $f_c = f_{IF} + \bar{f}_c$. Hence, if x(t) is the real, band-pass signal at low-IF, then $y(t) = x(t)e^{-j2f_c t}$ is the complex downshifted signal.

(2) Filter the down-shifted signal y(t) with a complex low-pass filter of bandwidth 50 kHz, for example.

(3) Down-sample the filtered signal from $f_s$ to 50 kHz, to form the signal z(t).

(4) Take $N_{FFO}$ (e.g. 2048) point FFT of the down-sampled signal z(t) to form $z_n(k)$. This results in a bin spacing of $50 \times 10^3 / N_{FFO}$.

Figure 4:
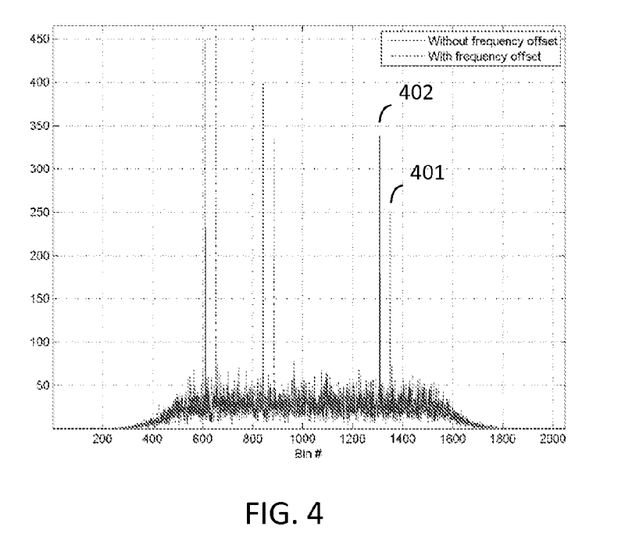
FIG. 4 illustrates a plot of P(k) showing the three continual pilot locations with and without a frequency offset; 2K, 1/32 mode, SNR=−10 dB and $N_{FFO}$=2K.

(5) Average FFT output squared across multiple FFT blocks to improve reliability of the estimate:

$$P(k) = \sum_{n=1}^{N} Z_n^2(k),$$

where k=1 to $N_{FFO}$. The parameter N is determined by the sensing time. The FFT size and the number of blocks can be defined by the user and will depend on the sensing time. FIG. 4 shows the plot of P(k) using $N_{FFO}$=2K and N=8 for an SNR of −10 dB with a frequency offset 401 and without a frequency offset 402.

(6) Determine the location of the three largest peaks (corresponding to the number of continual pilots) in P(k) and compare it with the expected continual pilot location values. The difference in this metric (multiplied by the bin spacing) will give an estimate of the frequency offset.

Using three (or more) pilot sub-carriers ensures that a good estimate can be obtained even in the presence of multi-path impairments. Additionally, the above described process can be repeated for another set of continual pilots and then the frequency offset estimate can be derived from the combined metrics.

The estimate is then applied to the received signal and then the processing continues with data smoothing and cross-correlation.

In another example embodiment, using the above sampling technique and data transformation and processing, the presence of primary transmission can be inferred from the presence of these peaks that correspond to the reference signals of the pilots in DVB transmissions, such as the ones shown in FIG. 4. In a processing module, metrics derived from the peak magnitudes or a relative difference between the calculated and expected locations or a combination of these two can be used to detect the presence of the incumbent signals.

Figure 5:
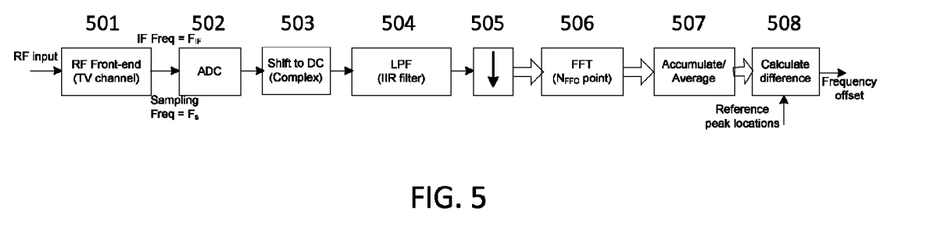
FIG. 5 illustrates a block diagram of the frequency offset estimator.

FIG. 5 shows a simplified block diagram representation of the frequency offset estimator, including: a RF Front-end module 501 for receiving the RF input; an analog-to-digital converter (ADC) 502 to convert the received RF signal to digital signal; a Shift to DC module 503 to downshift the signal to DC by the nominal frequency offset; a low-pass filter (LPF) 504 having an infinite impulse response (IIR) to filter the signal to a preferred bandwidth; a sampler 505 to downsample the filtered signal to the preferred bandwidth; a FFT module 506 to transform the signal; an accumulator and averaging module 507 to average the FFT output across multiple FFT blocks over the sensing time; and a calculation module 508 to calculate the frequency difference from the reference locations.

The proposed method can be extended to the 8K transmission mode by identifying the appropriate continual pilot sets and using the appropriate sub-carrier spacing to determine $\bar{f}_c$.

Figure 6:
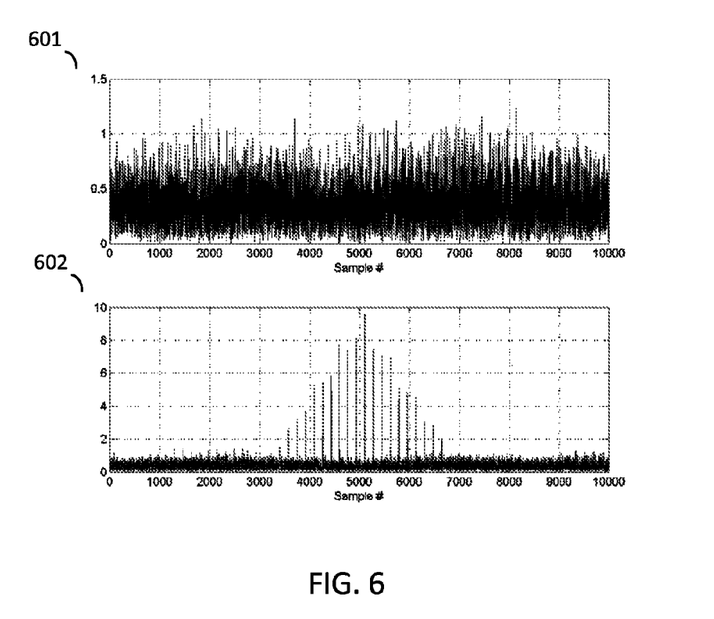
FIG. 6 illustrates a cross-correlator output in the presence of a frequency offset in an AWGN channel with an SNR of −5 dB without (top) and with (bottom) a frequency offset estimation and correction.
Figure 7:
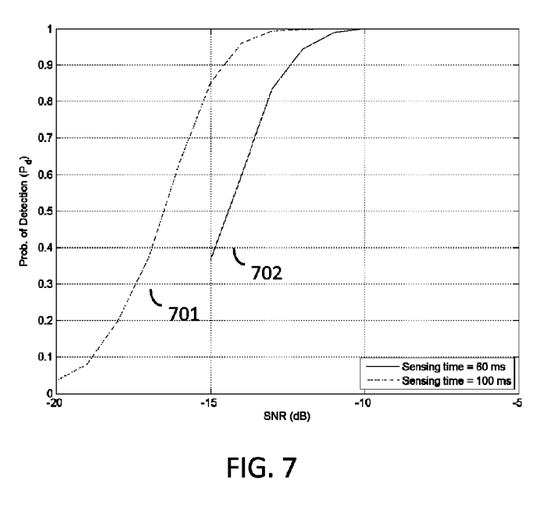
FIG. 7 illustrates the performance of DVB-T sensing algorithm in an AWGN channel in the presence of a frequency offset of 2.1 kHz with a sensing time of 60 ms and 100 ms.
Figure 8:
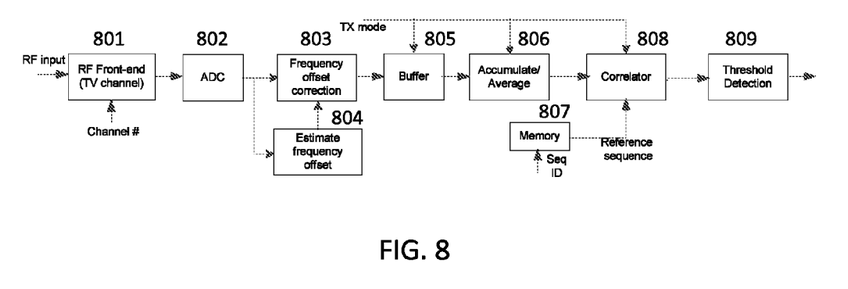
FIG. 8 illustrates a block diagram of DVB-T sensor including frequency offset estimation and correction.

FIG. 6 compares the output of the cross-correlator (with data smoothing) in the presence of a frequency offset with frequency offset estimation and correction 602 and without frequency offset estimation and correction 601 for an SNR of −5 dB in an AWGN channel. The performance of the frequency offset estimator can be further improved by increasing the number of blocks to be averaged (results in increased sensing time). The performance of the proposed DVB-T sensor in an AWGN channel with a 2.1 kHz frequency offset for two different sensing times is shown in FIG. 7. It can be seen from the plots 701 and 702 that using a sensing time of 100 ms provides better performance that a sensing time of 60 ms. The following simulation parameters were used:

Transmission mode—2K, 1/32
Number of runs for each SNR—1000,
Smoothing factor L—8 (~60 ms sensing time)
Probability of false alarm ($P_{FA}$)—<0.01.
Channel: AWGN
System for Robustly Detecting DVB-T Signals FIG. 8 shows the block diagram of the complete DVB-T sensor in an example embodiment. It includes the RF front-end 801, an ADC module 802 and the modules for frequency offset estimation 804 (shown in FIG. 5) and correction module 803. The corrected output is stored in the buffer 805. The modules accumulate/average 806 and correlator 808 implement cross-correlation after data smoothing. The signal 'seq ID' input to memory 807 determines the reference sequence to be used for correlation. The output of the correlator 808 is compared against a threshold value by the threshold detection module 809. If the detector is constrained for sensing time, then the frequency offset estimation/correction and cross-correlation can be performed on the same set of data samples by using a memory module 807 to store data after the ADC module 802.

Figure 9:
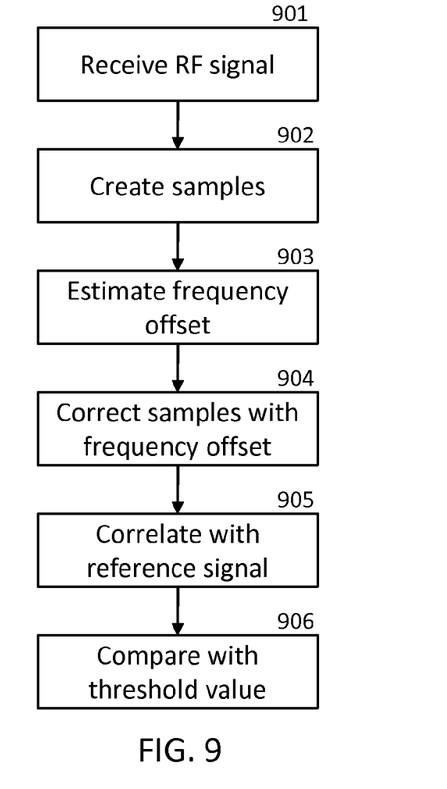
FIG. 9 illustrates a process for detecting the presence of a DVB signal.
Figure 10:
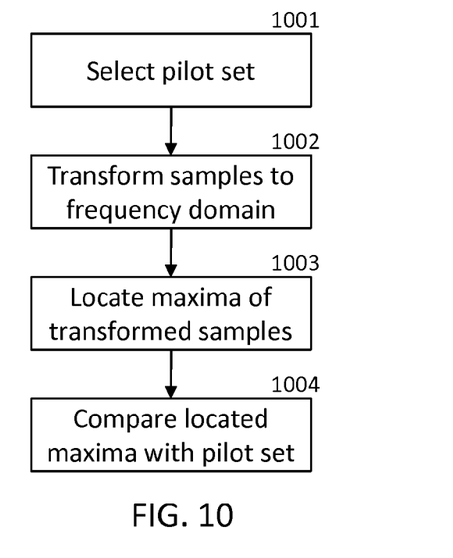
FIG. 10 illustrates a process for estimating frequency offset.

FIG. 9 shows the process of detecting the presence of a DVB according to an example embodiment. The process includes: receiving an RF (radio frequency) signal in a selected channel 901; creating samples from the received RF signal 902; estimating a frequency offset of the samples 903; correcting the samples with the estimated frequency offset 904; correlating the corrected samples with a reference signal 905; and comparing a correlation result with a threshold value 906. Based on the results of the comparison, the presence of a DVB can be determined. FIG. 10 shows the details of a frequency offset estimation. The estimation includes: selecting a set of three or more pilots that are boosted continual pilots transmitted at fixed sub-carrier locations in all symbols 1001; transforming the received samples to the frequency domain 1002; determining locations of maxima in the transformed samples, the maxima corresponding to the pilots in the set 1003; and comparing the determined locations with the expected pilot locations in the set 1004.

The techniques described in this disclosure can be used in cognitive radios and other systems that rely on detection and avoidance techniques for the detection of DVB-T/H signals or other OFDM signals that include defined pilot patterns.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware and software. Moreover, the software is preferably implemented as an application program tangibly embodied on a program storage unit or computer readable storage medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The invention claimed is:

1. A method for detecting the presence of a DVB (digital video broadcasting) transmission, comprising:
   receiving an RF (radio frequency) signal in a selected channel;
   creating samples from the received RF signal;
   estimating a frequency offset of the samples;
   correcting the samples with the estimated frequency offset;
   correlating the corrected samples with a reference signal associated with the DVB transmission to be detected;
   comparing a correlation result with a threshold value; and
   determining the presence of the DVB transmission based on the comparison.

2. The method of claim 1, wherein the estimating the frequency offset of the sample comprises:
   selecting a set of three or more pilots that are boosted continual pilots transmitted at fixed sub-carrier locations in all symbols;

transforming the received samples to the frequency domain;
determining locations of maxima in the transformed samples, the maxima corresponding to the pilots in the set; and
comparing the determined locations with the expected pilot locations in the set.

3. The method of claim 2, wherein the creating the samples from the received RF signal comprises:
down-shifting the signal by a nominal frequency offset;
filtering the down-shifted signal to a bandwidth around a frequency span of the pilots in the set; and
down-sampling the filtered signal.

4. The method of claim 2, wherein the determining locations of maxima in the transformed samples comprises identifying the maxima from an average across multiple blocks of samples.

5. The method of claim 2, further comprising combining estimation results with another set of three or more pilots.

6. The method of claim 1, wherein the reference signal is generated from pilots and is stored in memory.

7. A method for detecting the presence of a DVB (digital video broadcasting) transmission, comprising:
receiving an RF (radio frequency) signal in a selected channel;
creating samples from the received RF signal;
selecting a set of three or more pilots that are boosted continual pilots transmitted at fixed sub-carrier locations in all symbols associated with the DVB transmission to be detected;
transforming the samples to the frequency domain;
identifying locations of maxima in the transformed sample; and
determining the presence of the DVB transmission based on whether the identified maxima correspond to the pilots in the set.

8. The method of claim 7, wherein the creating the sample from the received RF signal comprises:
down-shifting the signal by a nominal frequency offset;
filtering the down-shifted signal to a bandwidth around a frequency span of the pilots in the set; and
down-sampling the filtered signal.

9. A system for detecting the presence of a DVB (digital video broadcasting) transmission, comprising:
an RF (radio frequency) front-end module for receiving an RF signal;
an analog-to-digital converter for creating samples from the received RF signal; and
a processor configured to:
estimate a frequency offset of the samples;
correct the frequency of the samples;
correlate the corrected samples with a reference signal associated with the DVB transmission to be detected;
compare a correlation result with a threshold value; and
determine the presence of the DVB transmission based on the comparison.

10. The system of claim 9, wherein the processor is further configured to:
select a set of three or more pilots;
transform the received samples to the frequency domain;
determine locations of maxima in the transformed samples, the maxima corresponding to the pilots in the set; and
compare the determined locations with the expected pilot locations in the set.

11. The system of claim 10, wherein the processor is further configured to:
down-shift the signal by a nominal frequency offset;
filter the down-shifted signal to a bandwidth around a frequency span of the pilots in the set; and
down-sample the filtered signal.

12. The system of claim 10,
wherein the processor is further configured to average results across multiple blocks of samples or over multiple sets of pilots.

13. The system of claim 9, further comprising:
a memory module for storing a reference signal generated from pilots.

14. A system for detecting the presence of a DVB (digital video broadcasting) transmission, comprising:
an RF (radio frequency) front-end module for receiving an RF signal;
an analog-to-digital converter for creating samples from the received RF signal; and
a processor configured to: transform the samples to the frequency domain, identify locations of maxima in the transformed sample and determine the presence of the DVB transmission based on whether the identified maxima correspond to a selected set of three or more pilots that are boosted continual pilots transmitted at fixed sub-carrier locations in all symbols associated with the DVB transmission to be detected.

15. The system of claim 14, wherein the processor is further configured to:
down-shift the signal by a nominal frequency offset;
filter the down-shifted signal to a bandwidth around a frequency span of the pilots in the set; and
down-sample the filtered signal.

* * * * *